US008473611B1

(12) United States Patent
Meier et al.

(10) Patent No.: US 8,473,611 B1
(45) Date of Patent: Jun. 25, 2013

(54) REFERRER CACHE CHAIN

(75) Inventors: Richard E. Meier, Sandy, UT (US);
Roger G. Harrison, South Jordan, UT
(US); Todd Miller, Draper, UT (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 529 days.

(21) Appl. No.: 12/554,663

(22) Filed: Sep. 4, 2009

(51) Int. Cl.
*G06F 15/173* (2006.01)
(52) U.S. Cl.
USPC ........... 709/225; 709/217; 709/223; 709/224; 709/226; 709/229
(58) Field of Classification Search
USPC .................. 709/217, 223, 224, 225, 226, 229
See application file for complete search history.

(56) References Cited

U.S. PATENT DOCUMENTS

| 7,426,750 | B2 * | 9/2008 | Cooper et al. | 726/26 |
|---|---|---|---|---|
| 7,631,032 | B1 * | 12/2009 | Refuah et al. | 709/201 |
| 2004/0006621 | A1 | 1/2004 | Bellinson | |
| 2005/0027820 | A1 * | 2/2005 | O'Laughlen et al. | 709/217 |
| 2007/0250901 | A1 * | 10/2007 | McIntire et al. | 725/146 |
| 2010/0153539 | A1 * | 6/2010 | Zarroli et al. | 709/224 |

* cited by examiner

*Primary Examiner* — Liangche A Wang
(74) *Attorney, Agent, or Firm* — Tarek N. Fahmi, APC

(57) ABSTRACT

A request for content is received at a content filter of a computer system, and a determination is made, based on a referrer included in the request, regarding a root site directly or indirectly associated with the request. Thereafter, the content is permitted or not permitted according to whether or not the root site is a permitted site and a site associated with the content is categorized in a semantically equivalent content category with the root site. The determination regarding the root site may involve consulting a referrer chain cache storing lists of referrers which associate referring Web sites with root sites from which referrals originate.

6 Claims, 4 Drawing Sheets

REFERRER CACHE CHAIN

FIELD OF THE INVENTION

The present invention relates to methods and systems for automatically compiling referrer chains for white listed Web sites and storing same in a local cache.

BACKGROUND

The Internet is a vast and expanding network of networks of computer systems and other devices linked together by various telecommunications media, enabling all of these systems and devices to exchange and share data. The World Wide Web provides a graphical interface for navigating the Internet and so-called Web sites provide information about a myriad of corporations and products, as well as educational, research and entertainment information and services. While the availability of these resources is of great benefit to anyone having access to a personal computer (PC) or other device capable of "surfing" the Web, there are also associated drawbacks.

Many Web sites contain content that is inappropriate for viewing by children. Accordingly, parents are often advised to install some form of Internet filtering software on computer systems that will be used by children to protect those children from exposure to such inappropriate material. In general, whenever a Web site is visited, the filtering software checks to see whether the Web site has been determined to be one that includes inappropriate content and permits or denies display of the Web site accordingly (in some cases, a "prohibited" screen may be displayed if the Web site is one that is blocked).

Parents can configure the filtering software to permit or deny Web sites based on categories such as pornography, hate speech, violence, gambling and others. Companies are continually rating new Web sites and updating databases for Internet filtering software so as to keep up with the proliferation of new sites on the Internet. In some cases, if the filtering software encounters a Web site that does not exist in a database, the filtering software may scan the Web site for inappropriate material, and then either permit or prohibit access to the site based on that determination and update the database accordingly.

In addition to relying on Web site categorization, parents can use "black lists" to designate specific Web sites that they do not wish their children to be exposed to. For example, some parents may not want very young children exposed to news-oriented Web sites, which may include reports of violence but which themselves are not categorized as violence-oriented sites. Likewise, parents can "white list" sites that may fall within a category that would otherwise be blocked. An example might be a specific social networking site that parents deem acceptable even though the broader category of social network sites might be blocked.

The white listing of sites that would otherwise be blocked can lead to problems where Web pages on those sites contain referrers to pages or objects from other sites that are included in categories to be blocked by the filtering software. In such cases, the white listed site may fail to display properly in a user's Web browser. Accordingly, what is needed is a solution to address these issues.

SUMMARY OF THE INVENTION

In one embodiment, the present invention provides a process in which a request for content is received at a content filter of a computer system, the request including a referrer, and a determination is made, based on the referrer, regarding a root site associated with the request. Thereafter, the content is permitted or not permitted according to whether or not the root site is a permitted site and a site associated with the content is categorized in a semantically equivalent content category with the root site. The determination regarding the root site may involve consulting a referrer chain cache storing lists of referrers which associate referring Web sites with root sites from which referrals originate. A further embodiment of the invention involves permitting or not permitting content to be loaded from a Web site according to a first determination regarding a status of a root site associated with a source of a referrer request for the content and a second determination regarding whether or not the Web site and the root site share a common categorization.

These and other features and advantages of the present invention are described further below.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
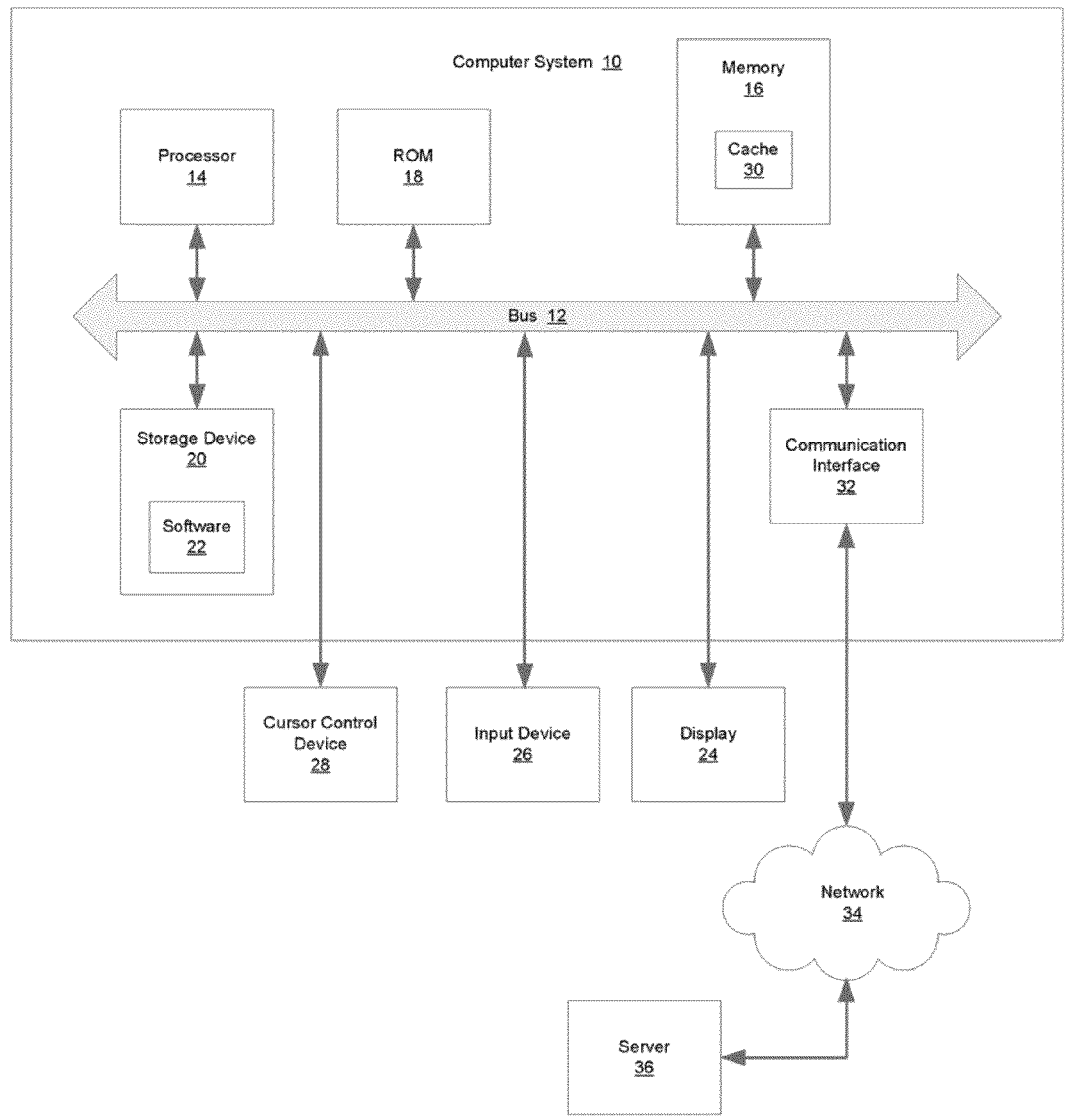
FIG. 1 illustrates an example of a computer system configured with a referrer cache in accordance with an embodiment of the present invention.

Described herein are methods and systems for automatically compiling referrer chains for white listed Web sites and storing same in a local cache. These solutions address problems which may be encountered as the result of white listing of Web sites that would otherwise be blocked where Web pages on those sites contain referrers to pages or objects from other sites that are included in categories to be blocked by Internet filtering software. By implementing the solutions proposed herein, users are freed from the task of having to manually create and/or delete referrer lists when sites are white listed and/or removed from white lists. Further, parents and others who use Internet filter software need not disable blocking of entire categories of Web sites in order to permit access to selected sites within such categories.

As noted above, parents and others may decide to block access to certain Web sites based on content available at those sites. Common examples include sites devoted to so-called adult content. Increasingly, social networking sites are among the categories of sites which parents want blocked, either out of concern about the kinds of activities that may be taking place on or through such sites or out of a general desire to have children spend less time "on-line".

But whether it concerns social networking sites or other categories of Web sites, blocking access to an entire category of Web sites often goes beyond the intent of the parents or others employing the filtering software. Many times, certain individual sites within a category of sites may be deemed acceptable by parents or others, even if other sites within the same category might be objectionable. This is especially true where sites are categorized into multiple categories, some of which may include objectionable sites. Usually, when a Web site is listed in a single category to be blocked by filtering software, that is sufficient to prevent access to that site from a computer equipped with the filtering software.

Consequently, when configuring Internet filtering software, it is rarely sufficient to simply choose the categories of sites to be blocked. Often this will result in an over-inclusive list of blocked sites and users must fine tune their filtering criteria by manually adding individual sites from blocked categories to a white list. This is a list of sites which, even if they are included in a category to be blocked, are not blocked when a user seeks to access same using a Web browser or other application.

This manual creation of a white list works well as long as the Web pages of the white listed sites do not contain significant numbers of referrers. In those instances, where significant numbers of referrers are present, pages at the white listed sites often will not display properly in a Web browser because the referred content is located at a blocked site. To understand why this is so, some background is useful.

Web pages are not pages in the traditional sense. That is, they are not like pages of a book or magazine where all of the text, images and other content are included on a single, common sheet of paper. Instead, Web pages are actually more akin to computer programs. Indeed, Web pages are best regarded as resources that can be accessed through a kind of computer program, known as a Web browser, that reads and interprets the Web page and arranges text, images and other content referred to in the Web page (e.g., JavaScript files and style sheets) on a display of a computer system on which the browser is running at locations and using fonts, colors, etc. according to instructions included in the Web page in a process known as rendering.

In order to render a Web page, a browser reads the instructions that make up the page and makes requests for content indicated by those instructions at locations specified by the instructions. The locations may be specified in the form of uniform resource identifiers (URIs), of which uniform resource locators (URLs) are a common form, which identify computer hosts, directories and files where the referenced object (e.g., images and the like) can be obtained. Browsers are equipped to read the Web page instructions, determine the address at which each referenced object is stored and make a request for the identified object from its host. When the object is received from the host, the browser displays it at the location on the display indicated by the instructions in the Web page.

When the browser makes a request for an object referenced in a Web page, it includes a referrer with the request. More specifically, the request is formatted to include a referrer request-header that allows the browser to specify, for the hosting server's benefit, the address (URI) of the resource (the referring Web page or at least the Web site, i.e., the domain, from which the page was obtained) from which the request-URI was obtained. The referrer request-header allows the hosting server to keep track of where the requests for content are coming from. The format of a referrer request header is:

Referer="Referer" ":" (absoluteURI|relativeURI)

Where the spelling "referer" is the convention adopted in Request for Comments 2616, "Hypertext Transfer Protocol—HTTP/1.1", published by the Internet Engineering Task Force.

Referrers then may be regarded as pointers to other Web pages or resources at which content, such as images, files, etc., are stored. Hence, when a request for content is made (via a browser) to a resource indicated by a referrer, the Internet filtering software at the computer system from which the request originates will examine that resource to determine whether it is one included in a blocked category. If so, the filtering software will block the return of the requested content. As a result, the browser which is rendering the Web page which included the referrer will not have any content to include in the location indicated by the instructions which make up the Web page and so the display of that Web page may be compromised. Thus, even though the browser was trying to load a Web page from a white listed site, because portions of the content on that page came from one or more blocked sites, the white listed site page will not be displayed properly.

To address and overcome this problem, the present invention introduces a referrer cache chain for Internet filtering software. The referrer cache chain provides means for the Internet filtering software to determine the top level (i.e., the root) site with which a referrer request is associated. That is, based on information stored in the referrer chain cache, the Internet filtering software can determine the root site associated with the request (this is not always possible from the referrer request header itself because such header information is typically only one level deep and may not reveal the root site). For each request, the Internet filtering software consults the referrer cache chain to determine whether the root site associated with the request is still a permitted site. Assuming the root site is a permitted site (either because it is white listed or is classified in a category that is not subject to blocking), then the Internet filtering content determines whether or not the site from which the content is requested is a permitted site. If so, the requested content is not blocked (e.g., it is allowed to load in the browser as part of a current Web page). If, however, the site from which the content is requested is one that would ordinarily be blocked, then the Internet filter software further determines whether that site is classified in a semantically equivalent category as the root site associated with the referrer request. By semantically equivalent category we mean either the same category as the root site or a closely-related category. For example, a category labeled "brokerage/trading" may be regarded as being closely related to a category labeled "financial services". Indeed, there may even be overlap between the two. Accordingly, in some embodiments of the invention if a root category was "brokerage/trading", then "financial services" sites may be deemed sufficiently similar so as to be treated in the same fashion. In other embodiments, only sites characterized as "brokerage/trading" may be so treated.

If the subject site is classified in a semantically equivalent category, then the Internet filtering software will allow the requested content to be retrieved and displayed, even though the site from which the content originates is one that would otherwise be blocked. Otherwise, if the site from which the content is requested is classified would be explicitly blocked or if it is in a different category from the root site associated with the referrer request and that category would be blocked, then the requested content is blocked and is not displayed as part of the current Web page.

The present Internet filter software may be installed as an application, browser plug-in or other form of software entity on any of a variety of computer-based platforms, such as a personal computer, a mobile phone or personal digital assistant, a server, a proxy server, or any other computer system where the use of such filtering software would be advantageous. FIG. 1 illustrates an example of a computer system 10 on which the present Internet filter software may be installed. This example should not be read as restricting the kinds of platforms on which the present Internet filter software can be used and the precise make up of a computer system on which the present Internet filter software is installed is not critical to the present invention.

Computer system 10 includes a bus 12 or other communication mechanism for communicating information, and a processor 14 coupled with the bus 12 for processing information. Computer system 10 also includes a main memory 16, such as a random access memory (RAM) or other dynamic storage device, coupled to the bus 12 for storing information and instructions to be executed by processor 14. Main memory 16 also may be used for storing temporary variables or other intermediate information during execution of instructions to be executed by processor 14. Computer system 10 further includes a read only memory (ROM) 18 or other static storage device coupled to the bus 12 for storing static information and instructions for the processor 14. A storage device 20, such as a magnetic disk or optical disk, is provided and coupled to the bus 12 for storing information and instructions, including but not limited to an instance of the present Internet filtering software 22.

Computer system 10 may be coupled via the bus 12 to a display 24, for displaying information to a user of the computer system. An input device 26, including alphanumeric and other keys, is coupled to the bus 12 for communicating information and command selections to the processor 14. Another type of user input device is cursor control 28, such as a mouse, a trackball, or cursor direction keys for communicating direction information and command selections to processor 14 and for controlling cursor movement on the display 24. This input device typically has two degrees of freedom in two axes, a first axis (e.g., x) and a second axis (e.g., y) allowing the device to specify positions in a plane.

According to one embodiment of the invention, during execution instructions comprising the Internet filtering software may be read into main memory 16 from another computer-readable medium, such as storage device 20 (which may be any of several types of computer-readable medium such as a floppy disk, a flexible disk, a hard disk drive, magnetic tape, or any other magnetic medium, a CD-ROM, a DVD-ROM, any other optical medium, a flash memory or other solid state storage medium, or another storage medium capable of persistent storage of electrical, electromagnetic, or optical signals). Execution of the sequences of instructions contained in the main memory 16 causes the processor 14 to perform the actions described herein, and in particular the processes related to automatically compiling and storing referrer chains for white listed Web sites. The referrer chains may be stored in a cache 30, which may be a designated portion of memory 16 and/or storage device 20. In alternative embodiments, hard-wired circuitry may be used in place of or in combination with computer software instructions to implement the invention. Thus, embodiments of the invention are not limited to any specific combination of hardware circuitry and software.

Computer system 10 also includes a communication interface 32 coupled to the bus 12. Communication interface 32 provides a two-way data communication as is known. For example, communication interface 32 may be an integrated services digital network (ISDN) card or a modem to provide a data communication connection to a corresponding type of telephone line. As another example, communication interface 32 may be a local area network (LAN) card to provide a data communication connection to a compatible LAN. Wireless communication links, such as WiFi or Bluetooth™ communication links may also be implemented. In any such implementation, communication interface 32 sends and receives electrical, electromagnetic or optical signals which carry digital data streams representing various types of information. For example, two or more computer systems 10 may be networked together in a conventional manner with each using an instance of a communication interface 32.

Computer system 10 may be communicatively coupled, via communication interface 32, to a network 34. Network 34 typically provides data communication to other data devices. For example, network 34 may provide a connection to a server 36 or to other data equipment. Network 34 may be a LAN or a network of networks, such as the Internet. In such an instance, communication between computer system 10 and other data equipment may be transported through networks operated by various internet service providers, but such details are not shown in this illustration so as not to unnecessarily complicate the drawing. In some embodiments, instances of the present Internet filtering software may be downloaded to computer system 10 from server 36 across network 34.

Figure 2:
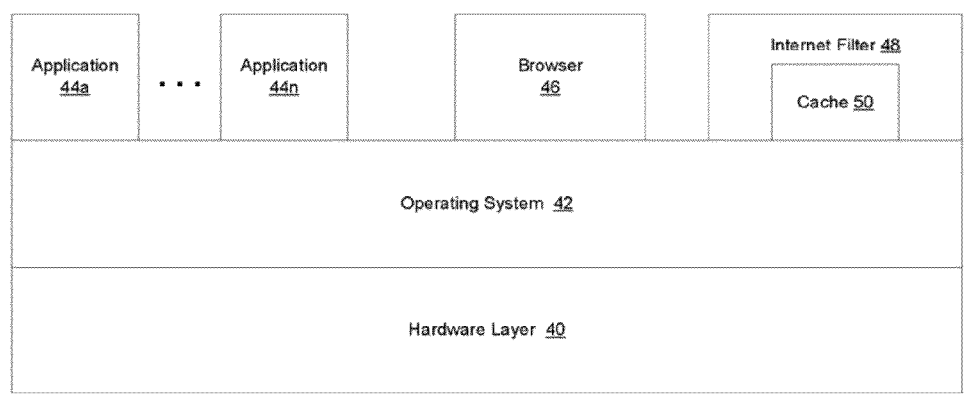
FIG. 2 illustrates an example of a software architecture for the computer system of FIG. 1.

FIG. 2 illustrates a software architecture 38 for systems such as computer system 10. As indicated above, computer system 10 includes various hardware components, such as processors, memory and other storage media, and the like. These elements are collectively represented as hardware layer 40. An operating system 42 abstracts this hardware layer and is responsible for the management and coordination of activities and the sharing of these resources by various application programs 44a-44n that run on computer system 10. Among these application programs may be a Web browser 46 and the Internet filter software 48. Although shown as a separate application program, in some embodiments the Internet filter software may be a plug-in or other module for the browser 46 or another of the application programs 44a-44n. The Internet filter software 48 includes the referrer cache 50. This cache is a defined area of memory where the referrer chains described herein are stored for ready access.

Figure 3:
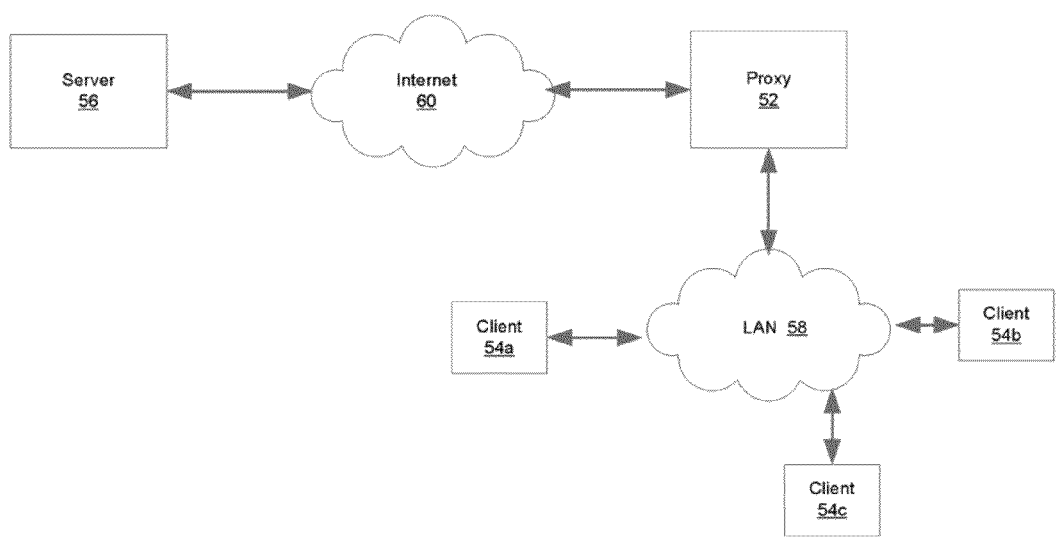
FIG. 3 illustrates an example of a proxy configured for use in accordance with embodiments of the present invention.

As mentioned above, embodiments of the present invention may have the present Internet filter software executing on platforms such as a proxy or other content filtering apparatus. An example of such a configuration is shown in FIG. 3. In this instance, a proxy 52 acts as an intermediary between clients 54a-54c and resources such as server 56. The clients may be part of a LAN 58 and the proxy may be logically located between the LAN 58 and the Internet 60. LAN 58 can represent a network of any size or complexity. Requests for content that originate with a client 54a-54c are evaluated by proxy 52 according to various content filtering rules, including, in this example, the referrer chain rules described herein. If the request is validated, the proxy may respond directly to the client (if it stores a valid copy of the requested content) or provide the requested resource by connecting to the relevant server 56 (via Internet 60) and requesting the service on behalf of the client. In addition to proxies, embodiments of the present invention can be implemented in routers, gateway devices, personal computers, host devices, or any combination of the above.

Figure 4A:
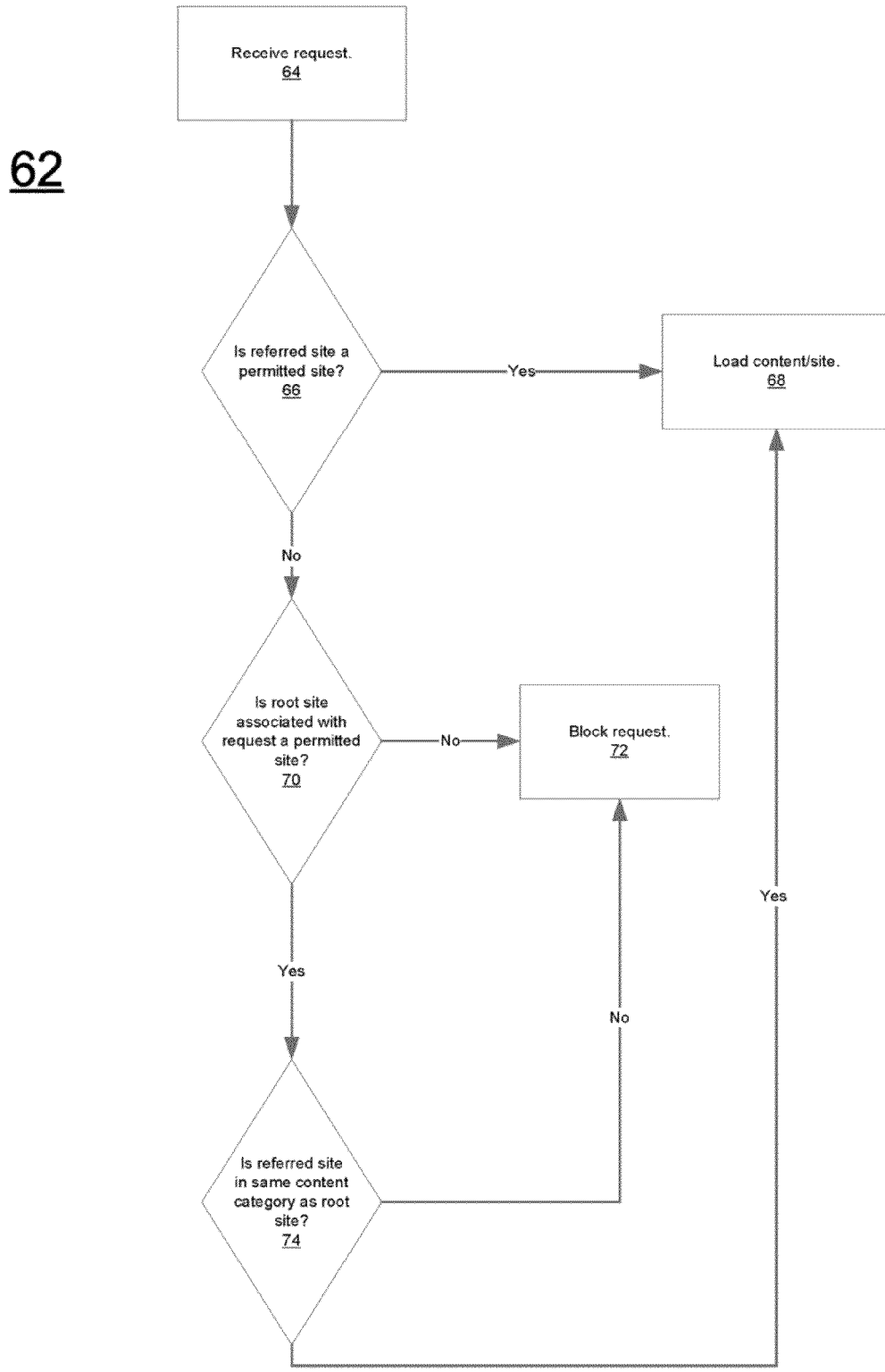
FIGS. 4A and 4B are flow diagrams illustrating examples of processes for determining whether or not to permit content from a referred site to load in accordance with embodiments of the present invention.

FIG. 4A is a flow diagram illustrating an example of a process 62 for determining whether or not to permit content from a referred site to load in accordance with the present invention. The referrer chain, which is preferably stored in a cache accessible to the Internet filtering software, provides means for the Internet filtering software to determine the top level (i.e., the root) site with which a referrer request is associated. Accordingly, in response to receipt of a request 64, the Internet filtering software determines whether or not the site from which the content is requested (the referred site) is a permitted site 66. If so, the requested content is not blocked (e.g., it is allowed to load in the browser as part of a current Web page) 68.

If, however, the site from which the content is requested is one that would ordinarily be blocked, then the Internet filter software consults the referrer cache to determine whether the root site associated with the request is a permitted site 70. If not, the request is blocked 72.

If, however, the root site associated with the request is a permitted site, then the Internet filter software further determines whether the referred site is classified in a semantically equivalent category as the root site associated with the referrer request 74. If so, then the Internet filtering software will allow the requested content to be retrieved and displayed 68, even though the site from which the content originates is one that would otherwise be blocked. Otherwise, if the site from which the content is requested is classified in a different category from the root site associated with the referrer request and that category would be blocked, then the requested content is blocked 72 and is not displayed as part of the current Web page.

Figure 4B:
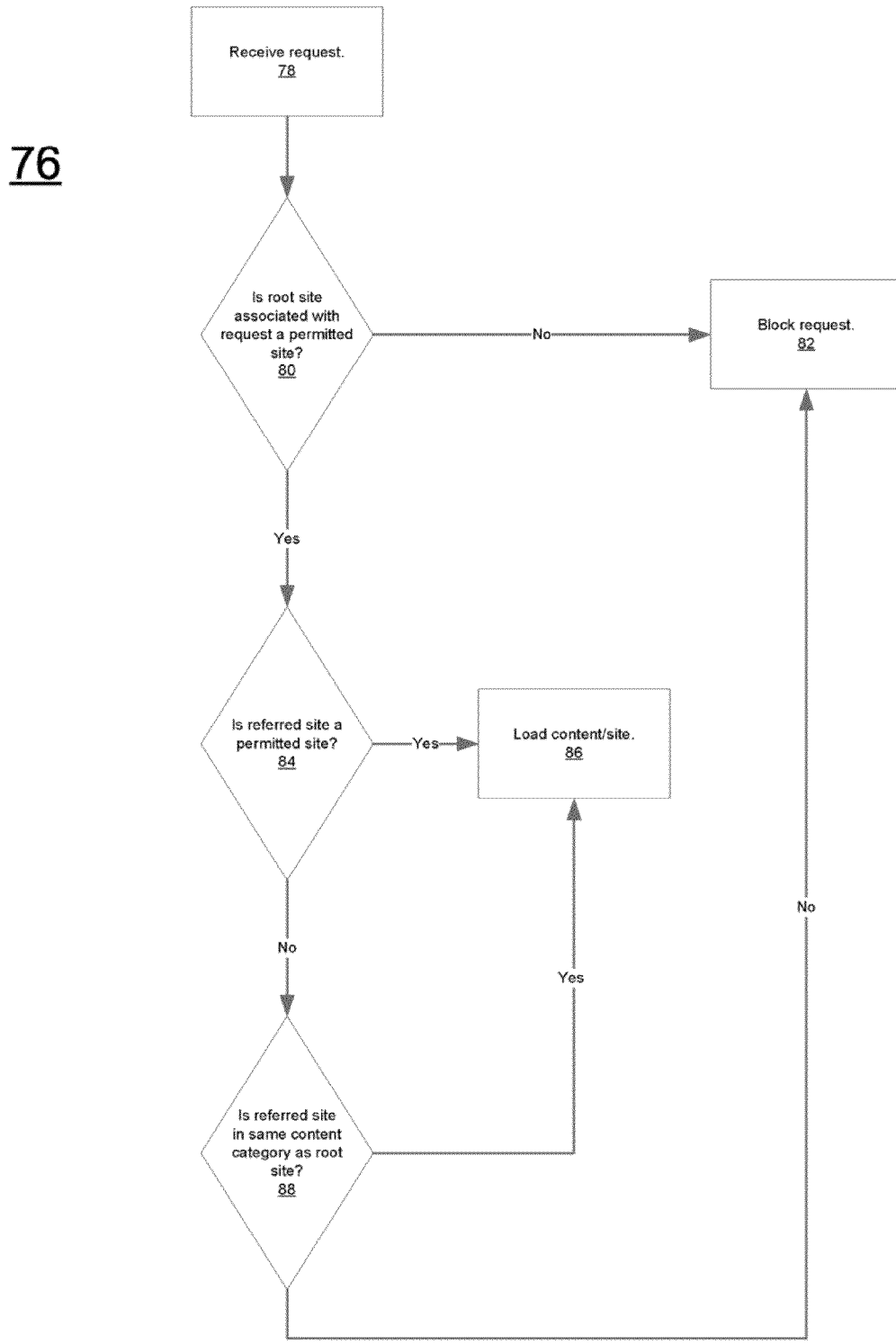

FIG. 4B illustrates an alternative implementation of a process for determining whether or not to permit content from a referred site to load in accordance with the present invention. In process 76, in response to receipt of a request 78, the Internet filtering software consults the referrer cache to determine whether the root site associated with the request is still a permitted site 80. If not, the request is blocked 82.

If, however, the root site is a permitted site (either because it is white listed or is classified in a category that is not subject to blocking), then the Internet filtering content determines whether or not the site from which the content is requested is a permitted site 84. If so, the requested content is not blocked (e.g., it is allowed to load in the browser as part of a current Web page) 86. If, however, the site from which the content is requested is one that would ordinarily be blocked, then the Internet filter software further determines whether that site is classified in a semantically equivalent category as the root site associated with the referrer request 88. If so, then the Internet filtering software will allow the requested content to be retrieved and displayed 86, even though the site from which the content originates is one that would otherwise be blocked. Otherwise, if the site from which the content is requested is classified in a different category from the root site associated with the referrer request and that category would be blocked, then the requested content is blocked and is not displayed as part of the current Web page 82.

The above-described processes assume that a referrer chain by which a root site can be determined exists and is stored in a referrer chain cache. Construction of the referrer chain, and storing of same in the referrer chain cache, is therefore an important consideration. By way of example, in one implementation of the invention the referrer chain is established as a set of top level referrers. Each top level referrer has a doubly linked list of all URLs that were traversed to by starting at the top level referrer. With this list, the Internet filter software can traverse a path to all URLs that started from the top level. If a top level referrer is no longer a permitted site, then when it is de-listed the top level referrer and all its associated URLs are also removed from the referrer cache. This may be done at the time the site is de-listed or over time as requests are observed and blocked.

The following example illustrates the above concepts. Suppose a user navigates to a white listed Web site, socialnetwork.com, by directly typing the address of the site into the browser. As the site loads, the browser will traverse to other resources, such as JavaScript files and style sheets. For example, the browser may ask for a style sheet, style_sheet.com/main.css. Since this file was traversed to (implicitly) it will be added to the referrer cache list of URLs associated with socialnetwork.com.

After the socialnetwork.com page loads, suppose the user selects a link displayed on the page, socialnetwork.com/friends. This is an explicit traversal and will also be added to the socialnetwork.com referrer chain stored in the referrer chain cache. Next, suppose the user selects (e.g., clicks) a link, socialnetwork.com/status, on the socialnetwork.com/friends page. The referrer for this link is socialnetwork.com/friends, but since socialnetwork.com/friends is in the top levels list for socialnetwork.com in the referrer cache, socialnetwork.com/status will also be added to the referrer list for socialnetwork.com.

Continuing the example, if the socialnetwork.com/status page seeks to load content from another site, say anothersocialnetwork.com/george.htm, the Internet filter software consults the referrer chain stored in the cache to determine the root site for the request. In this instance, the referrer chain will point back to socialnetwork.com, the original root site from which the traversals to socialnetwork.com/friends and socialnetwork.com/status originated. Now, the Internet filter software executes the process 62 discussed above to determine whether or not to permit the requested content from anothersocialnetwork.com to be displayed. Assuming the root site, socialnetwork.com, is still white listed, but that anothersocialnetwork.com is not, the decision will hinge on whether or not anothersocialnetwork.com is grouped in a semantically equivalent content category as socialnetwork.com. If so, then the content will be permitted to load, otherwise, it will not (if it is categorized in a disallowed category).

Note that this example illustrates the relative simplicity of the process shown in FIG. 4A over that shown in FIG. 4B. For the process shown in FIG. 4A, checking whether the new site is in an allowed category or explicitly allowed via a white list, obviates the need for a later check, as is the case with the process shown in FIG. 4B. Nevertheless, either process can be used.

Thus, various schemes for automatically compiling referrer chains for white listed Web sites and storing same in a local cache have been described. In the foregoing description, various data structures were given names, such as "referrer chain cache", however, these names are used merely to describe and illustrate various aspects of the present invention, and in no way limit the scope of the present invention. Furthermore, the various modules described herein can be implemented as software or hardware modules, or without dividing their functionalities into modules at all. The present invention is not limited to any modular architecture either in software or in hardware.

Some portions of the detailed description above were presented in terms of algorithms and symbolic representations of operations on data within a computer system's memory or other data storage medium. Such algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention may be instantiated in computer software, that is, computer-readable instructions, which, when executed by one or more computer processors/systems, instruct the processors/systems to perform designated actions. Such computer software may be resident in one or more computer-readable storage media, such as a hard drive, CD-ROM, DVD-ROM, read-only memory (ROM), read-write memory (RAM), flash memory, or other storage medium. Such software may be distributed on one or more of these media, or may be made available for download from one or more servers across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Below is a computer program listing which is one example of an implementation of a referrer cache configured in accordance with the present invention.

```
class RootReferrer
{
public:
    ...
private:
    CatList m_allowedCats;
};
class LeafReferrer,
{
public:
    ...
private:
    URL m_rootUrl;
};
typedef std: :map<URL, RootReferrer> RootRefMap;
typedef std: :map<URL, LeafReferrer> LeafRefMap;
class ReferrerCache
{
public:
    ...
    // Adds a root level referrer
    CLError AddReferrer(const URL &url, const CatList &tmpCats);
    // Removes a URL from the cache
    CLError Remove(const URL &url);
    // Marks a given category as blocked based on cache value, also adds leaves to
    cache tree.
    CLError OverrideBlockedCategories(const URL &refUrl, const URL &targetUrl,
    CatList &blockedCats);
private:
    ...
    RootRefMap m_rootMap;
    LeafRefMap m_leafMap;
};
CLError ReferrerCache: :AddRoot(const URL &url, const RootReferrer &root)
{
    m_rootMap.insert(RootRefPair(url, root));
    return CL_OK;
}
CLError ReferrerCache: :AddReferrer(const URL &url, const CatList &tmpCats)
{
    return AddRoot(url, RootReferrer(tmpCats));
}
CLError ReferrerCache: :AddReferrer(const URL &url, const CatList &tmpCats, uint32_t
    timeOutInSecs)
{
    return AddRoot(url, RootReferrer(tmpCats, (uint32_t)m_counter.GetSeconds( ) +
    timeOutInSecs));
}
CLError ReferrerCache: :Remove(const URL &url)
{
    CLError err = CL_NOT_FOUND;
    RootRefMap: :iterator rootIt = m_rootMap.find(url);
    if (rootIt != m_rootMap.end( ))
    {
        LeafRefMap: :iterator leafIt;
        for(leafIt = m_leafMap.begin( );   leafIt != m_leafMap.end( );)
```

-continued

```
      {
        if (leafIt->second.GetRootUrl( ) == url)
          m_leafMap.erase(leafIt++);
        else
          ++leafIt;
      }
      m_rootMap.erase(rootIt);
      err = CL_OK;
    }
    else
    {
      LeafRefMap: :iterator leafIt = m_leafMap.find(url);
      if (leafIt != m_leafMap.end( ))
      {
        m_leafMap.erase(leafIt);
        err = CL_OK;
      }
    }
    return err;
}
CLError ReferrerCache: :OverrideBlockedCategories(const URL &refUrl, const URL
    &targetUrl, CatList &blockedCats)
{
    // This will hold the root URL in case there is a need to add a leaf.
    URL: :Ptr pRootUrl;
    RootRefMap: :iterator rootIt(m_rootMap.end( ));
    LeafRefMap: :iterator leafIt(m_leafMap.find(refUrl));
    if (leafIt != m_leafMap.end( ))
        rootIt = m_rootMap.find(leafIt->second.GetRootUrl( ));
    // Did not find a root so do a fuzzy search in the root map.
    if (rootIt == m_rootMap.end( ))
    {
      for(rootIt = m_rootMap.begin( ); rootIt != m_rootMap.end( );)
      {
        BOOLEAN matched = false;
        if ((matched = FuzzySearchHosts(rootIt->first.GetHost( ).c_str( ),
    refUrl.GetHost( ).c_str( ))) == TRUE)
          if ((matched = FuzzySearchPaths(rootIt->first.GetPath( ).c_str( ),
    refUrl.GetPath( ).c_str( ))) == TRUE)
            {
              // Found a fuzzy match so set the root URL for later leaf addition
    and bail out.
              pRootUrl.reset(new URL(rootIt->first));
              break;
            }
        ++rootIt;
      }
      // Could not locate this URL in the maps.
      if (rootIt == m_rootMap.end( ))
        return CL_NOT_FOUND;
    }
    // Do not evaluate a referrer if its timeout has elapsed.
    uint32_t timeOut;
    if (rootIt->second.HasTimeOut(timeOut) && timeOut < m_counter.GetSeconds( ))
        return CL_NOT_FOUND;
    // Root should be valid, so modify blockedCats list.
    CatList: :const_iterator catIt;
    for(catIt = rootIt->second.GetAllowedCats( ).begin( ); catIt != rootIt-
    >second.GetAllowedCats( ).end( );)
    {
      blockedCats.erase(*catIt);
      ++catIt;
    }
    // For a valid root via a fuzzy match, add a leaf.
    if (pRootUrl.get( ))
    {
      // Ensure that the root URL is still valid (still exists in cache)
      if (m_rootMap.find(*pRootUrl) != m_rootMap.end( ))
      {
        LeafReferrer newLeaf(*pRootUrl);
        m_leafMap.insert(LeafRefPair(targetUrl, newLeaf));
      }
    }
    return CL_OK;
}
```

What is claimed is:

1. A method, comprising:

receiving, at a content filter of a computer system, a request for content, the request including a referrer of the request; and permitting or not permitting the content to be downloaded according to whether or not a root site associated with the referrer of the request is a permitted site by:

determining, based on the referrer, whether a root site associated with the referrer is a permitted site and, i. if the root site is not a permitted site, then not permitting the content to be downloaded; otherwise ii. if the root site is a permitted site, then determining whether or not a referred site specified by the referrer is a permitted site, and a. if-the referred site is a permitted site, then permitting the content to be downloaded, otherwise b. if the referred site is not a permitted site, then determining whether or not the referred site is in a semantically equivalent content category as the root site, and x. if the referred site is in a semantically equivalent content category as the root site, then permitting the content to be downloaded; otherwise z. if the referred site is not in a semantically equivalent content category as the root site, then not permitting the content to be downloaded.

2. The method of claim 1, wherein determining whether the root site is a permitted site comprises consulting a referrer chain cache storing lists of referrers which associate referring Web sites with root sites from which referrals originate.

3. A method, comprising:

receiving, at a content filter of a computer system, a request for content, the request including a referrer of the request; and permitting or not permitting the content to be downloaded according to whether or not a referred site associated with the referrer is a permitted site by:

determining whether or not the referred site associated with the content is a permitted site, and i. if the referred site is a permitted site, permitting the content to be downloaded, otherwise ii. if the referred site is not a permitted site, determining whether or not a root site associated with the referrer is a permitted site, and a. if the root site is not a permitted site, then not permitting the content to be downloaded, otherwise b. if the root site is a permitted site, determining whether the referred site is in a semantically equivalent content category as the root site, and x. if the referred site is not in a semantically equivalent content category as the root site, not permitting the content to be downloaded, otherwise z. if the referred site is in a semantically equivalent content category the root site, permitting the content to be downloaded.

4. A computer system, comprising:

a processor; and a memory communicatively coupled to the processor, the memory storing instructions, which when executed by the processor cause the processor to access, in response to a request for content, the request including a referrer of the request, and a referrer chain cache; determine, according to records stored in the referrer chain cache, a root site associated with the referrer of the request; and permit or not permit the content to be downloaded according to whether or not the root site is a permitted site by:

determining, based on the referrer, whether the root site associated with the referrer is a permitted site and, i. if the root site is not a permitted site, then not permitting the content to be downloaded; otherwise ii. if the root site is a permitted site, then determining whether or not a referred site specified by the referrer is a permitted site, and a. if-the referred site is a permitted site, then permitting the content to be downloaded, otherwise b. if the referred site is not a permitted site, then determining whether or not the referred site is in a semantically equivalent content category as the root site, and x. if the referred site is in a semantically equivalent content category as the root site, then permitting the content to be downloaded; otherwise z. if the referred site is not in a semantically equivalent content category as the root site, then not permitting the content to be downloaded.

5. A computer system, comprising:

a processor; and a memory communicatively coupled to the processor, the memory storing instructions, which when executed by the processor cause the processor to access, in response to a request for content, the request including a referrer of the request, and a referrer chain cache; determine, according to records stored in the referrer chain cache, a root site associated with the referrer of the request; and permit or not permit the content to be downloaded according to whether or not the referred site is a permitted site by:

determining whether or not a referred site associated with the content is a permitted site, and i. if the referred site is a permitted site, permitting the content to be downloaded, otherwise ii. if the referred site is not a permitted site, determining whether or not a root site associated with the referrer is a permitted site, and a. if the root site is not a permitted site, then not permitting the content to be downloaded, otherwise b. if the root site is a permitted site, determining whether the referred site is in a semantically equivalent content category as the root site, and x. if the referred site is not in a semantically equivalent content category as the root site, not permitting the content to be downloaded, otherwise z. if the referred site is in a semantically equivalent content category the root site, permitting the content to be downloaded.

6. The method of claim 3, wherein determining whether the root site is a permitted site comprises consulting a referrer chain cache storing lists of referrers which associate referring Web sites with root sites from which referrals originate.

* * * * *